United States Patent

[11] 3,620,274

[72] Inventor Gerald R. Anderson
 Campbell, Calif.
[21] Appl. No. 5,074
[22] Filed Jan. 22, 1970
[45] Patented Nov. 16, 1971
[73] Assignee FMC Corporation
 San Jose, Calif.

[54] FRUIT ALIGNING APPARATUS
 9 Claims, 14 Drawing Figs.
[52] U.S. Cl. .................................................. 146/52,
 146/224, 198/33 AA
[51] Int. Cl. .................................................. A23n 3/12
[50] Field of Search .......................................... 146/224,
 52, 17 A; 198/33 R, 33 AA

[56] References Cited
 UNITED STATES PATENTS
 2,247,602 7/1941 Carroll ......................... 198/33 AA
 3,156,277 11/1964 Keesling ..................... 146/52

3,310,084 3/1967 Anderson et al .............. 146/224 X

Primary Examiner—Willie G. Abercrombie
Attorneys—F. W. Anderson and C. E. Tripp

ABSTRACT: Indented fruit such as apples are oriented with their stem indents down on a cup conveyor. To improve and maintain this orientation, a rotatable stem indent centering pin moves upwardly into the indent and a rotatable blossom indent centering pin moves down into the blossom indent. The bottom centering pin lifts the fruit out of the cup, and the two centering pins are rotated in opposite directions. This rotation causes the fruit to shift into precise alignment with the centering pins, and a spring-biased centering cup coaxial with the upper centering pin preserves this alignment while the centering pins retract, and during the next following stemming operation.

INVENTOR.
GERALD R. ANDERSON

BY *J. W. Anderson*
*C. E. Tripp*

ATTORNEYS

FRUIT ALIGNING APPARATUS

1. Field of the Invention

The present invention relates to the orientation of fruit having stem and blossom indents such as apples, and more particularly concerns apparatus for engaging the stem indents and shifting the fruit so that the stem-blossom axis is positioned for the later entrance of a stemming tube to remove a plug which includes the stem and leaves a hole for the later entrance of a coring knife that removes the seed cell of the fruit.

2. Description of the Prior Art

The use of centering pins which engage the stem and blossom indents of apples for aligning the stem-blossom axis of the fruit for a subsequent stemming operation is known from the U.S. Anderson et al. Pat. No. 3,310,084, and the present invention is an improvement of the aligning apparatus disclosed therein. It has been found in actual practice of the patented apparatus that the orienting function, while efficient, can in some cases be further improved when handling fruit which does not have the usual degree of symmetry.

SUMMARY OF THE INVENTION

By rotating aligned centering pins which are in general alignment with the stem-blossom axis of an apple, and which move together toward the stem and blossom indents of the apple, the apple is shifted so that the centering pins and the indents of the fruit attain exact alignment. The shifting occurs because the sector of a pin which rests upon the sloping wall of a misaligned indent creates a lateral force upon the apple, whereupon the centering pin seeks a position further into the indent and the shifting action rapidly repeats until the centering pin is fully seated in the indent.

BRIEF DESCRIPTION OF THE DRAWINGS

FIG. 7 and 8 are diagrammatic elevations similar to FIG. 2, and illustrate the stemming operation which follows precise vertical alignment of the stem-blossom axis of an apple.

DESCRIPTION OF THE PREFERRED EMBODIMENT

The apple-coring machine 20 (FIG. 1) is of a known type which operates in substantial accord with the principles disclosed in U.S. Pat. No. 3,310,084, and in the same manner set forth in my joint copending application Ser. No. 5073 filed Jan. 22, 1970, and assigned to the same assignee as the present invention.

Figure 1:
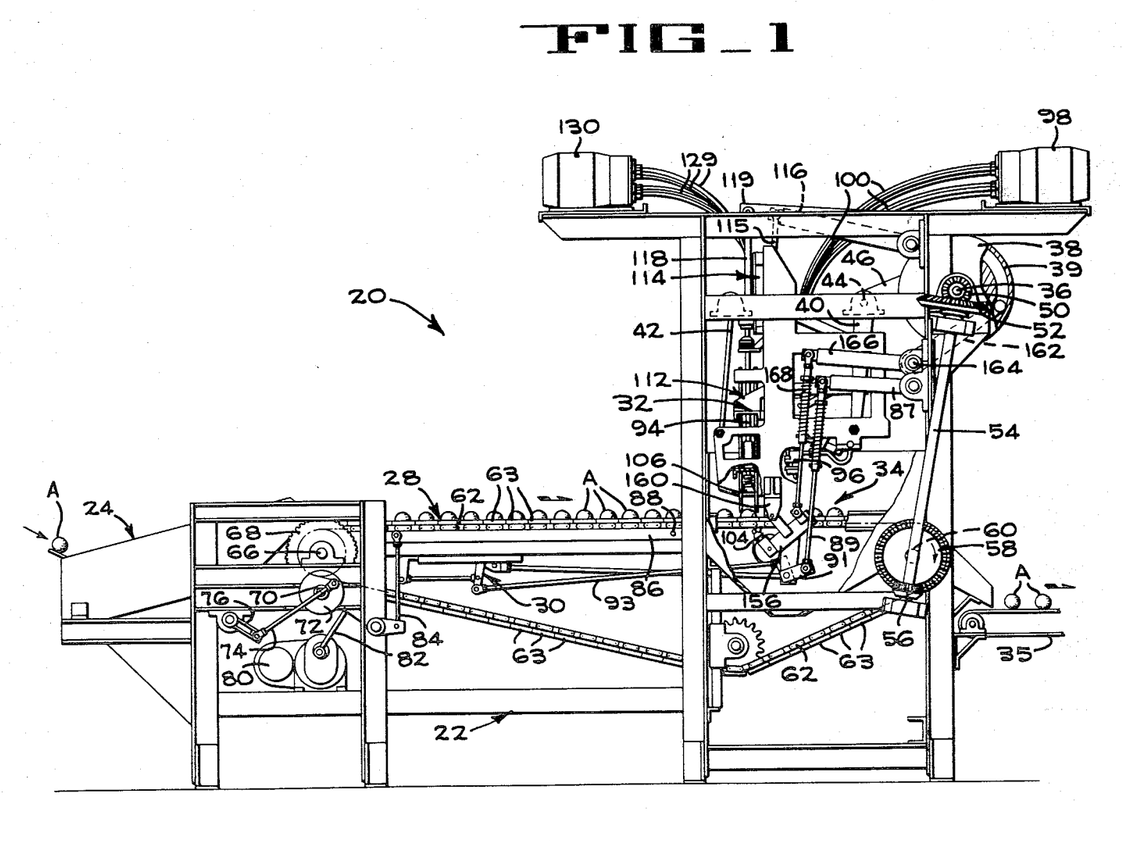
FIG. 1 is a side elevation of a known type of apple coring machine incorporating the present invention.

In brief, the apple coring machine 20 includes a floor supported fabricated frame structure 22 which supports a shuffle feeder until 24 at its inlet end. Multiple processing rows or lanes are provided throughout the machine, and the shuffle feeder 24 receives a random supply of apples A and arranges and discharges the apples into transverse rows of feed cups 26 which are part of a continuously moving cup conveyor 28. The shuffle feeder 24 is disclosed in U.S. Pat. No. 3,088,577.

An orienting mechanism 30 (as disclosed in my copending joint application, supra) is associated with the initial portion of the top flight of the conveyor 28, and operates to orient each apple with its stem indent down over a central aperture in the cup. Following this preliminary orientation, the transverse rows of apples are moved row by row under a longitudinally reciprocating coring head carriage indicated generally at 32. The coring head carriage includes, for each longitudinal lane of cups, vertically reciprocable apparatus for (1) Accurately aligning the stem-blossom axis of the apple vertical (2) Removing a core, along said axis, which includes the stem of the apple, and (3) Removing the seed cell of the apple. The present invention concerns the apparatus peculiar to item (1) and the accurate aligning function necessary for proper stemming and coring. After the apples are thus processed, they are carried to a washing station 34 and are then delivered to a discharge conveyor 35.

With more specific reference to general details of the machine components and their cooperative relation with the present inventive improvements in the coring head carriage 32, driving power for longitudinally reciprocating the carriage and for vertically reciprocating fruit processing tools within and associated with the carriage initiates with a main cross-shaft 36. The shaft 36 is continuously driven by a motor and gear reduction unit, not shown, that is disclosed in the aforementioned Anderson et al. U.S. Pat. No. 3,310,084. A series of circular cams, similar to later mentioned cams 38 and 39, are mounted on the shaft 36 to drive various components of the machine in timed relation.

The coring head carriage 32 reciprocates longitudinally in synchronism with the cup conveyor 28. Thus, a transverse row of fruit processing tools are lowered after the carriage 32 is in an upstream position, and begins to move downstream in synchronism with one transverse row of apples. For this purpose the carriage is supported at each side of the machine from the frame 22 on an oscillating pivot arm 40 and a follower link 42 which provide substantially linear motion for the carriage. Pivot arms 40 are secured to a cross-shaft 44, which is in turn secured to a follower arm 46 having a cam follower, not shown, engaged with the cam 38. By this construction, the described synchronous motion of the coring head with the cup conveyor 28 is attained.

Driving power for the cup conveyor 28 also originates with the main cross-shaft 36, and includes a pinion gear 50 on the cross-shaft. This gear drives a bevel gear 52 and an upright shaft 54. The lower end of the shaft 54 has a pinion gear 56 that rotates a bevel gear 58 and a cross-shaft 60 for the cup conveyor 28. Drive sprockets, not shown, are provided on the shaft 60 for spaced cup conveyor side chains 62. Each conveyor cup 26 is formed by a stamped depression formed in an elongate channel 63 (FIG. 2) which is connected to the side chains 62.

At the inlet end of the machine 20, the shuffle feeder 24 is provided with a driving connection to an idler sprocket shaft 66 of the cup conveyor 28 by a gear 68. By means of another gear, not shown, the gear 68 rotates a cross-shaft 70 having a crank disc 72 secured thereto. A shuffle feed drive link 74 is provided with an eccentric drive connection to the crank disc 72, and is connected to a feeder crank lever 76 which operates the shuffle feeder 24. In the manner more fully disclosed in the U.S. Pat. of Chamberlin, No. 3,088,577, the shuffle feeder is randomly supplied with fruit, and the fruit is formed into longitudinal lanes to be discharged one by one from each lane into the feed cups 26 aligned with the corresponding lanes.

Figures 2, 3:
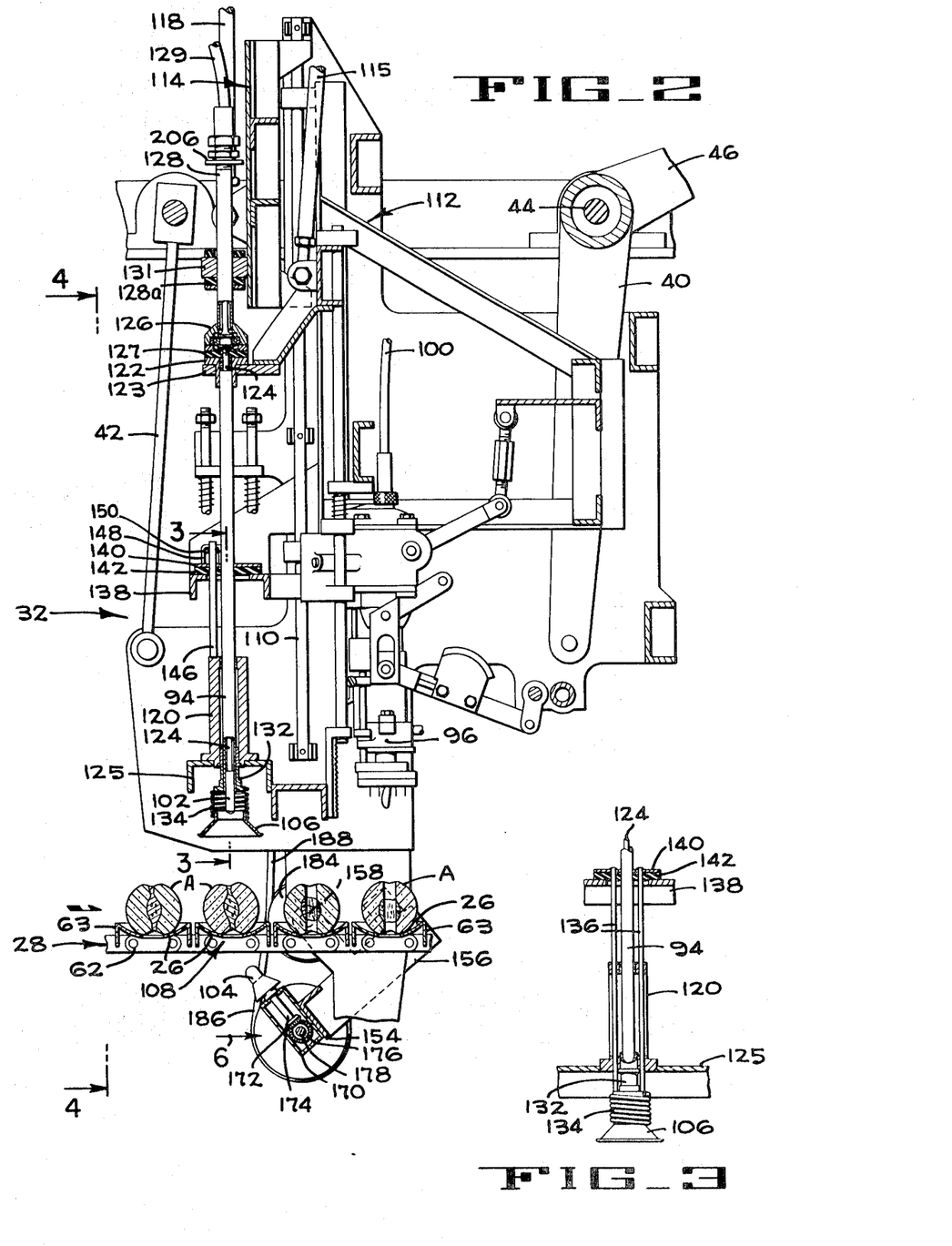
FIG. 2 is an enlarged fragmentary elevation of the coring station of the machine illustrated in FIG. 1.
FIG. 3 is a section taken along lines 3—3 on FIG. 2.

As is completely disclosed in my copending joint U.S. Pat. application Ser. No. 5073, the orienting mechanism 30 is operated by means including a motor 80 that drives a crank arm 82, and by vertically reciprocating links 84 at each side of the machine. The latter links are each connected to a track 86 that is pivoted to the frame at 88 and supports one of the conveyor chains 62. With this construction, the motor 80 imparts a rapid vibratory movement to the conveyor cups 26. In conjunction with indent finding mechanism that is disclosed in said patent application, the fruit are thus oriented as they approach the coring head unit 32 until their stem indents are facing down and are centered over central apertures in the fruit cups 26, as best shown in FIG. 2. The indent finding mechanism is driven from the main cross-shaft 36 by a cam and follower arm, not shown, to raise and lower a crank arm 87 at each side of the machine. By means of a vertical link 89 and a crank 91, a link 93 is shifted longitudinally of the machine to drive the indent finding mechanism vertically as the orienting mechanism 30 moves in following relation with successive transverse rows of the cups 26.

The coring head carriage 32 (FIG. 2) includes a stemming station and a coring station, the former having a vertically reciprocable stemming tube 94 for each lane of fruit, and the latter having a vertically reciprocable coring head 96 for each lane of fruit. As disclosed in the above-mentioned U.S. Pat. No. 3,310,084, the coring heads 96 are individually driven by an overhead motor 98 (FIG. 1) and separate flexible drive shafts 100 for the purpose of removing the seed cell of the fruit after the stemming tubes have removed a cylindrical plug which includes the stem. Since the stem plug is relatively small in diameter, it will be appreciated that accurate alignment of the stem-blossom axes of the fruit is necessary for both the stemming operation and the coring operation. The present invention concerns this alignment function, and mechanism including upper and lower centering pins 102 and 104, and a centering cup assembly 106, that carry out the aligning procedure in a manner assuring improved operation and yield over present aligning devices.

FIG. 2 illustrates the coring head carriage 32 in its upstream position just prior to a stemming operation on the transverse row of fruit at 108. As previously indicated, the coring head carriage follows the fruit row 108 downstream while the stemming operation is carried out, and then returns upstream to index with and follow the next upstream row of fruit. It will be apparent that the total downstream movement of the coring head carriage is less than the interspacing of the rows of cups in order to allow time for the return movement of the carriage into indexed relation with the next row of cups. In other words, accurate alignment is achieved while the fruit cups travel less than the distance between cup centers; less than four inches of cup travel is necessary for the aligning operation.

Rigidly mounted in the coring head carriage 32 are upright rods 110 which guide a vertically reciprocable stemming tube carrier 112 and a vertically reciprocable stem ejector driver 114 (see also FIGS. 7 and 8). The stemming tube carrier 112 is provided with a driving link 115 (FIG. 2) which is connected to a cam follower arm 116 (FIG. 1) at each side of the machine. In a manner similar to that described for moving the cam follower arms 46, the arm 116 is actuated by a cam, not shown, on the main cross-shaft 36 to raise and lower the stemming tube carrier 112 in timed relation with the movement of the feed cups 26. Similarly the stem ejector driver 114 is provided with a drive link 118, at each side of the machine, that is actuated by a cam follower arm 119 (FIG. 1) and another cam, not shown, on the main cross-shaft 36 to raise and lower the stem ejector driver in timed relation with the feed cups and with the stemming tube carrier.

Each stemming tube 94 (FIG. 2) is mounted for nonrotative endwise movement in a tubular guide 120, and has a flanged head portion 122 that is secured to a support bar 123 of the carrier 112 so that vertical movement of the carrier produces a corresponding movement of the stemming tube. The stemming tube guide 120 is secured to a fixed channel 125 of the coring head carriage 32. Mounted within the stemming tube 94, for both rotary and endwise motion, is a stem ejector rod 124, the lower end of which is secured to the upper centering pin 102. Extending upward from the stemming tube 94, the stem ejector rod 124 is provided with a flanged head portion 126 which is arranged to be supported on a rubber pad 127 of the flanged head 122 of the stemming tube 94 when the stemming tube carrier 112 is in its uppermost position shown in FIG. 2.

The flanged head 126 also provides a drive connection to a vertically slidable drive coupling 128 on the lower end of a flexible drive shaft 129 which is driven by a motor 130 (FIG. 1) so that the stem ejector rod 124 is continuously rotated within the nonrotating stemming tube 94. This causes continuous rotation of the upper centering pin 102 and as later described in detail, produces a cooperative action with the centering cup 106 and the lower centering pin 104 to rapidly and accurately align the stem-blossom axis of the fruit in the interposed conveyor cup 26. The drive coupling 128 is provided with a collar 128a that is arranged to be engaged by a superposed driving collar 131 on the stem ejector driver 114 to actuate the stem ejector rod 124 in a manner later described.

Slidable on the lower portion of the stemming tube 94, below the channel 126, is a tubular member 132 that provides a mounting boss for the upper end of a centering cup-mounting spring 134, to the lower end of which the centering cup 106 is secured. With this mounting arrangement, the axis of the centering cup is normally coincident with the axes of the centering pin 102, and the spring 134 biases the cup toward this position from any other position it may temporarily assume.

As best shown in FIG. 3, a cup support rod 136 is provided at each side of the stemming tube 94. These rods are secured to the spring mounting member 132, extend upward through the stemming tube guide 120, and through a large aperture in a fixed channel member 138. The upper ends of the guide rods are welded to a plate 140 which has a rubber pad 142 bonded thereto and resting on the channel 138. It should be noted that the channel 138 is a part of the stemming tube carrier 112. Therefore, when the carrier 112 is lowered from its uppermost FIG. 2 position, the centering cup 106 is free to descend into contact with a subposed fruit.

In a manner more fully disclosed in the U.S. Pat. of Anderson et al. No. 3,199,558, each centering cup assembly is provided with a locking mechanism which temporarily prevents upward displacement of the cup after it is seated on a fruit. For this purpose, a locking rod 146 (FIG. 2) extends upward from the stemming tube guide 120, through the pad 142 and plate 140 of the cup support assembly, and through a U-shaped yoke 148 that is welded to the plate 140. Mounted in the yoke 148 is a pivotally mounted lock arm 150 that has an enlarged aperture circumscribing the locking rod 146. In a known manner, the lock arm 150 binds on the locking rod 146 to temporarily prevent upward displacement of the centering cup 106 when the stemming tube 94 is withdrawn from the fruit after a stemming operation. Later, when the stemming tube carrier 112 rises, an unlocking pin 152 (FIG. 7) on the channel 138 lifts the locking arm 150 and releases the locking rod 146 to free the cup.

Figures 4, 6:
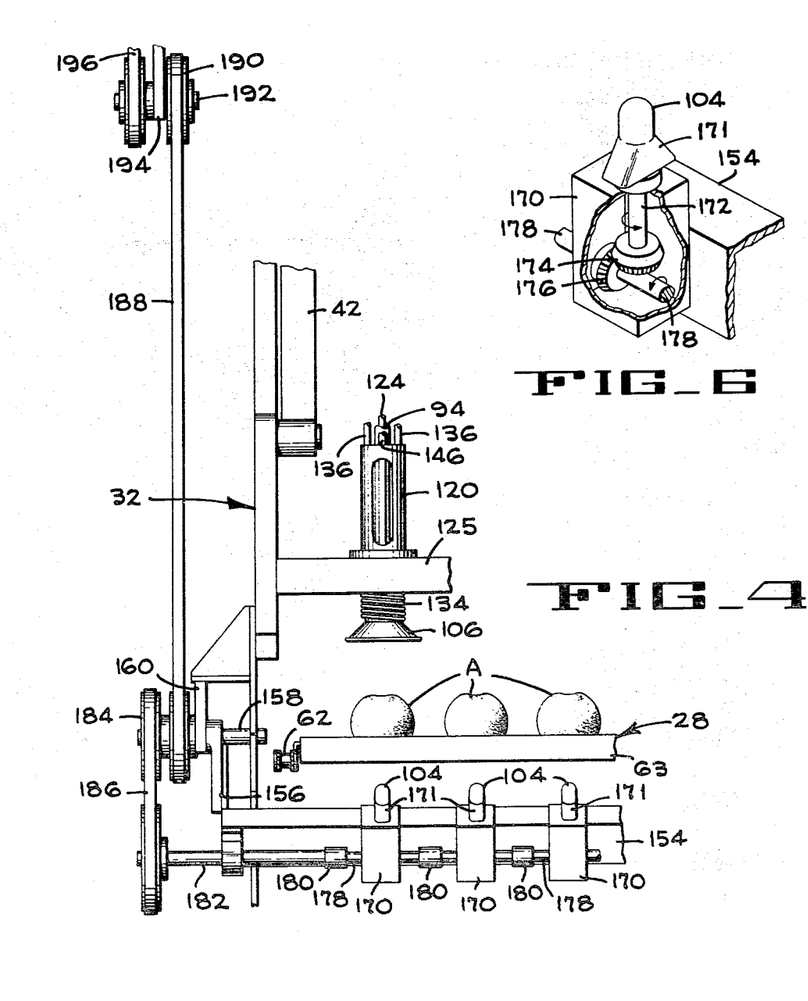
FIG. 4 is a fragmentary section taken along lines 4—4 on FIG. 2.
FIG. 6 is an enlarged isometric of the mechanism indicated by the arrow 6 on FIG. 2.

With reference to FIGS. 2 and 4, the lower centering pins 104 are carried by a cross angle bar 154. A pivot arm 156 on each end of the angle bar is pivoted on a fixed stub shaft 158 to a bracket 160 that is fixed to the coring head carriage 32. In order to pivot the arms 156 and thus raise and lower the centering pins 104, the previously mentioned cam 39 (FIG. 1) actuates a cam follower arm 162 to reciprocate a cross-shaft 164. This motion raises and lowers a drive arm 166 at each side of the machine that is connected to the shaft 164. A drive link 168 interconnects each pivot arm 156 with its associated drive arm 166. Since the cam 39 is driven by the main cross-shaft 36, the lower centering pins 104 move up and down in timed relation to all of the other described components driven by the main cross-shaft.

Figure 5:
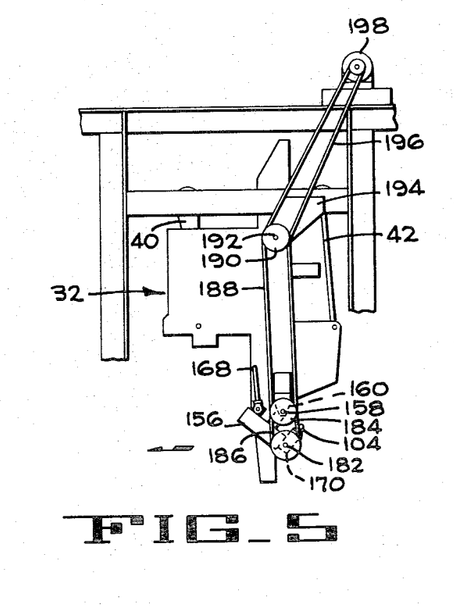
FIG. 5 is a schematic elevation illustrating the coring station from the opposite side of the machine illustrated in FIG. 1.

The lower centering pins are rotated in a direction opposite to the direction of rotation of the upper centering pins 102. For this purpose, each centering pin 104 (FIGS. 2 and 6) is mounted on a gearbox 170 and is connected by a clamp portion 171 to a driven shaft 172 that is provided with a bevel gear 174. Gear 174 is meshed with a bevel gear 176 on a short driven shaft 178. The several shafts 178 are coupled together by coupling sleeves 180 (FIG. 4) and driven by a gearbox shaft 182. Shaft 182 is rotatably secured to the cross angle bar 154, and thus swings up and down with the centering pins 104 about the axes of the stub shafts 158, as shown in FIG. 5. One portion of a double V-belt pulley 184 on one of the shafts 158 is provided with a V-belt drive connection 186 to the gearbox shaft 182. The other portion of the double pulley is connected by a V-belt 188 to a double idler pulley 190 which is mounted on an idler shaft 192 that is in approximate vertical alignment with the stub shaft 158 so that movement of the carriage 32 does not appreciably tension or slacken the V-belt 188. A bracket 194 depends from a portion of the frame 22 to hold the idler shaft, and another V-belt and pulley drive train 196 supplies driving power from a motor 198. By way of example, it has been found that an efficient range of rotational speeds for the upper and lower centering pins is between 700 to 1,300 revolutions per minute.

FIGS. 7 and 8 illustrate, in conjunction with the sequential operational views of FIGS. 9—14, the manner in which the centering pins 102 and 104, centering cup 106, stemming tube 94, and stem ejector rod 124 are manipulated to (1) accurately align the stem-blossom axis of the fruit (2) grip the fruit to maintain such alignment (3) cut a cylindrical stem plug from the fruit (4) eject the stem plug and (5) retract the stemming tube.

With brief reference to FIG. 2, the first mechanical movements are that the coring head carriage 32 starts moving downstream at the same speed as the cups 26 of the cup conveyor 28, and the stemming tube carrier 112 and driver 114 start moving downward on the moving carriage 32. The immediate effect is that the channel 138 of the stemming tube carrier 112 moves away from supporting relation with the centering cup support pad 142, allowing the centering cup 106 to lower by gravity. At the same time, the stemming tube support bar 123, travelling downward since it is part of the downwardly moving stemming tube carrier, drives the stemming tube 94 downward.

Figure 9:
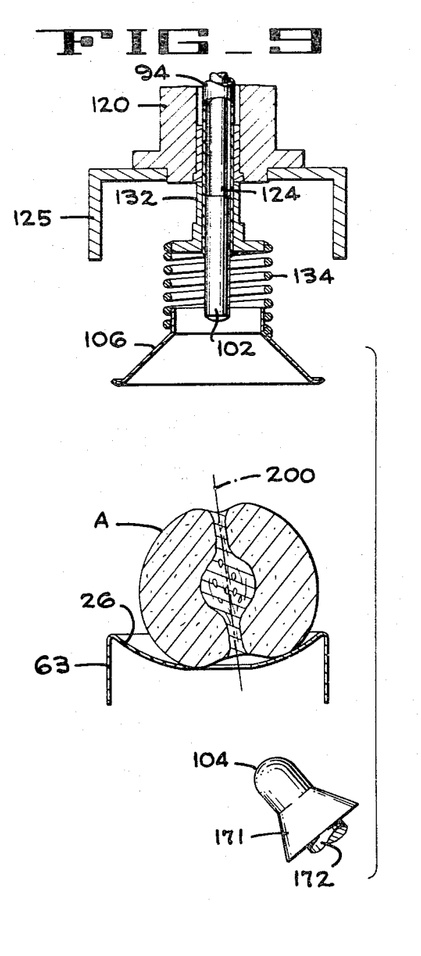
FIGS. 9-14 are enlarged views of the apple orienting and stemming mechanism shown in FIGS. 7 and 8, and illustrate the successive operations performed by the improved orienting mechanism of the invention.

FIG. 9 illustrates the same FIG. 2 position of the centering pins 102 and 104 and of the centering cup 106. Also shown is the tilt of the stem-blossom axis 200 that must be brought into vertical alignment with the stemming tube 94 in order to most efficiently carry out the stemming operation, and the subsequent coring operation.

Figure 10:
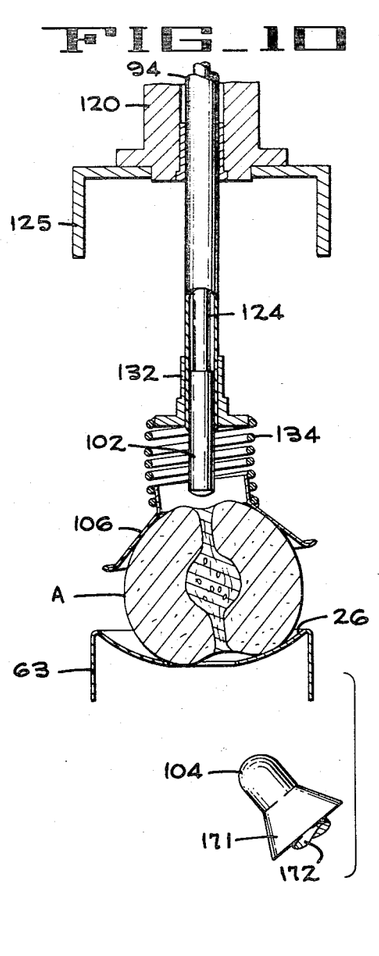

FIG. 10 clearly depicts the manner in which the cup mounting spring 134 accommodates the initial misalignment of the centering cup 106 as it seats upon the fruit. The upper centering pin 102 has not yet seated in the upper indent of the fruit because the flanged head portion 126 (FIG. 7) is still supported upon the rubber pad 127 of the stemming tube structure. In other words, FIG. 10 indicates that the stemming tube carrier 112 has not reached its downward limit of movement. It is important to note that because the spring 134 tends to return the centering cup toward vertical, the bottom surface of a misaligned fruit is urged toward aligned relation with the center of the fruit cup 26.

Figure 11:
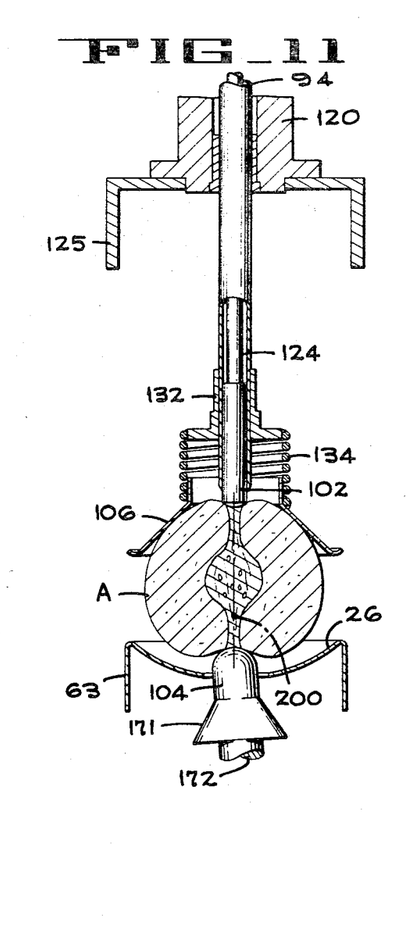

FIG. 11 discloses an important stage in aligning the stem-blossom axis 200 with the stemming tube 94. By this time, the stemming tube carrier 112 (FIGS. 7 and 8) has dropped out of supporting relation with the flanged head portion 126 of the ejector rod assembly. This frees the ejector rod 124 to drop by gravity, and the centering pin 102 on the lower end of the rod contacts the stem indent. At the same time, the large radius rounded end of the lower centering pin 104 has been moved upward through the central aperture in the fruit cup 26, and into lifting contact with the stem indent portion of the fruit to lift the fruit and compress the centering cup mounting spring 134.

It will be recalled that the upper centering pin 102 is continuously rotated by the driven stem ejector rod, and that the lower centering pin 104 is continuously rotated in the opposite direction. Thus, the combined rotation of the centering pins and the lifting of the fruit creates a somewhat unstable condition for the fruit, although the centering cup 106 maintains the general alignment of the fruit. As a result of the rotation of the centering pins and their tendency to move together due to the weight of the stem ejector parts forcing the upper centering pin down, and due to the weight supported by the lower centering pin—the counterrotating upper and lower centering pins shift the fruit because they automatically seek positions farther into their respective indents, and the spring mounting of the centering cup 106 not only permits, but actively assists such shifting. If the fruit is not symmetrical, the centering cup spring 134 allows displacement of the cup so that the upper centering pin 102 aligns that end of the fruit.

Figure 12:
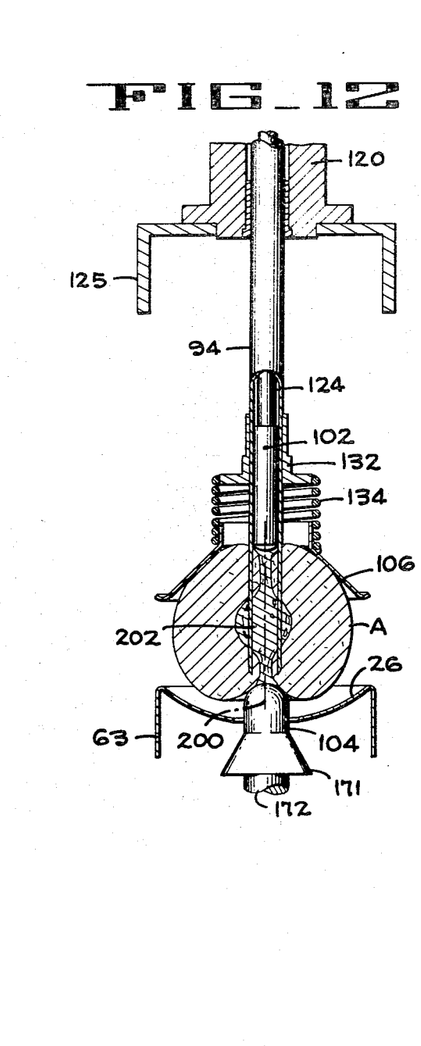

By the time the fruit has reached the FIG. 12 stemming position, the stem-blossom axis 200 has attained its optimum alignment and the stem and seed cell cavity 202 is thus in the best possible position for penetration by the stemming tube 94. It will be noted that the stemming tube penetrates the fruit before the lower centering pin 104 is withdrawn and allows the fruit to return to the fruit cup 26. Accordingly, the optimum alignment already achieved for the stem-blossom axis 200 cannot be adversely affected by the stemming operation because the stemming tube impales the fruit and prevents any misalignment such as might occur if the stemming operation began after the fruit was reseated in the cup.

Figure 13:
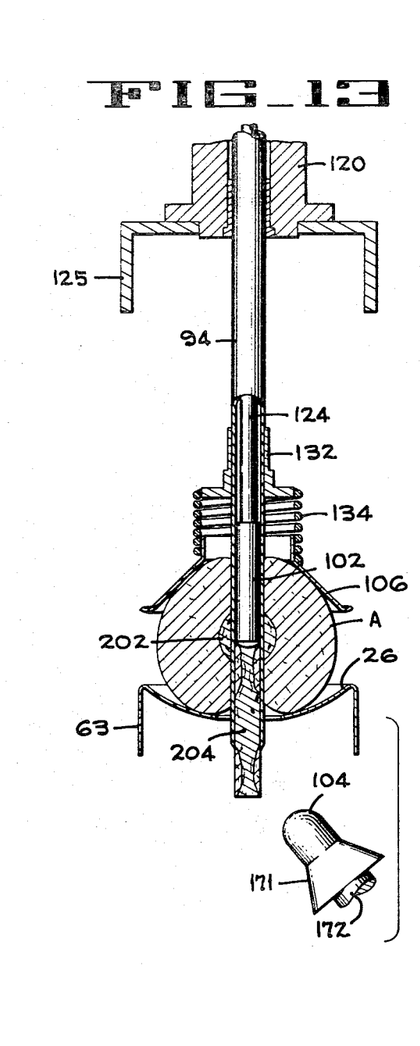

As shown in FIG. 13, the lower centering pin 104 is next retracted from the stem indent of the fruit, and the stemming tube 94 has completed its penetration of the fruit because the stemming tube carrier 112 (FIG. 7) is at its lowermost position. Further, the drive collar 131 on the stem ejector driver 114 has contacted the collar 128a on the flexible drive coupling 128—as shown in FIG. 8—and the stem ejector rod 124 is thus forcing the upper centering pin 102 through the stemming tube 94 to eject the stem core 204 which has been severed by the stemming tube. At this point it may be noted that in the event a fruit cup 26 does not contain a fruit, a flange 206 (FIG. 8) on the drive coupling 128 will drop onto the drive collar 131 of the stem ejector driver 114 and thus prevent the stem ejector rod 124 and centering pin 102 from dropping through the feed cup 26 to a position where other mechanism may be damaged.

Figure 14:
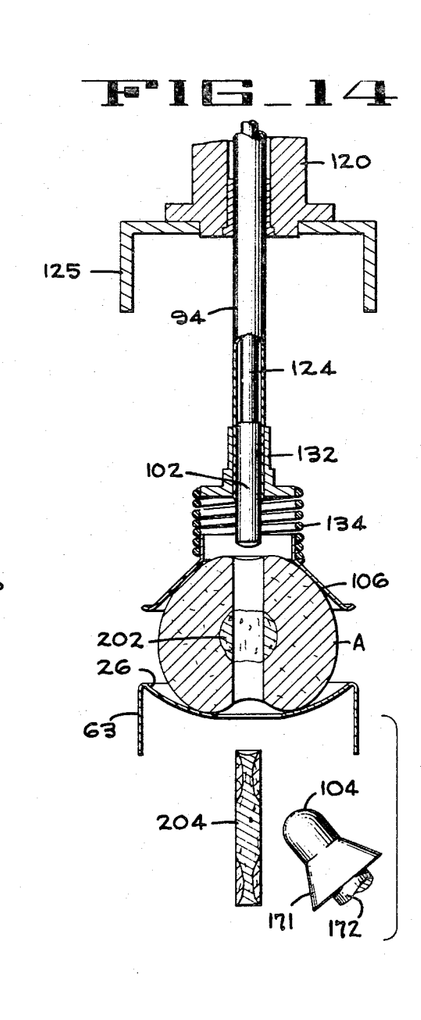

The last stage in the aligning and stemming operation is shown in FIG. 14, wherein the stem ejector rod 124 and the stemming tube 94 have retracted to their initial FIG. 9 positions after the stem core 204 has been fully severed and ejected. Up to this time, the centering cup 106 has been locked onto the fruit, as previously described, to prevent lifting and possible misaligning the fruit when the stemming tube 94 is retracted. Subsequently, the channel 138 (FIG. 8) of the stemming tube carrier 112 raises the unlocking pin 152 to release the locking mechanism for the centering cup, and the cup is positively elevated as the channel 138 contacts the pad 142 and raises the cup guide rods 136.

Again referring to FIG. 2, the transverse row 108 of fruit are aligned and stemmed, as described in connection with FIGS. 9—14, and no further operations are performed on these fruit while the next upstream row of fruit are processed. When the third row of fruit is processed, the first processed row of fruit is aligned with the row of coring heads 96, and are cored as described in U.S. Pat. No. 3,310,084.

In summary of some of the structural and functional features which effect the improved stem-blossom axis alignment, the counterrotating centering pins 102 and 104 and the lifting of the fruit in the cups 26 are basic to the inventive concept because this creates a condition of instability which facilitates shifting of the fruit to fully seat the centering pins in the stem indents. The spring biased and aligned centering cup structure is also important in urging the bottom surfaces of misaligned fruit toward centered relation with the conveyor cups 26, is resiliently stabilizing the elevated fruit while their stem-blossom axes are aligned, and in retaining the alignment when the stemming tubes are retracted from the fruit.

Although the best mode contemplated for carrying out the present invention has been herein shown and described, it will be apparent that modification and variation may be made without departing from what is regarded to be the subject matter of the invention.

I claim:

1. In a fruit-processing machine wherein a centrally apertured conveyor cup containing an indented fruit with one indent down conveys the fruit past a processing station, apparatus at said station for orienting the stem-blossom axis of the fruit comprising a lower centering pin movable upward through the cup aperture into general alignment with the lower indent of the fruit, an upper centering pin movable downward into general alignment with the upper indent of the fruit, and means for counterrotating said centering pins to create a lateral force on the fruit at each indent to automatically shift the fruit into a position wherein each centering pin is fully seated in its associated indent.

2. Apparatus according to claim 1 and power means for elevating said lower centering pin into supporting relation with the fruit to facilitate said shifting of the fruit.

3. Apparatus according to claim 1 and a centering cup associated with said upper centering pin, means mounting said centering cup coaxial with said upper centering pin, and means resiliently biasing said centering cup downward into engagement with the fruit.

4. Apparatus according to claim 3 wherein said lower centering pin lifts the fruit free of the conveyor cup, and means apart from said resilient biasing means for locking said centering cup mounting means against upward displacement from the fruit.

5. Apparatus according to claim 3 and means for preventing rotation of said centering cup.

6. Apparatus according to claim 1 wherein said centering pins are rotated at the same speed.

7. Apparatus according to claim 6 wherein said centering pins are each rotated at a speed of from 700 to 1,300 revolutions per minute.

8. Apparatus according to claim 3 and a stemming tube in circumscribing relation with said upper centering pin, means for plunging said stemming tube through the apple following its alignment with said centering pins, and means for subsequently plunging said upper centering pin through said stemming tube to eject the stem core therefrom.

9. In an apple processing machine wherein a centrally apertured conveyor cup containing an apple stem indent down conveys the apple to a stemming station, apparatus at said stemming station for orienting the stem-blossom axis of the apple comprising a lower centering pin movable upward through the cup aperture into general alignment with said stem indent, a centering cup symmetrical about a vertical axis aligned with the axis of said centering pin and movable downward onto the apple, an upper centering pin on said axis, means for conjointly moving said centering cup and said upper and lower centering pins into engagement with the interposed apple, centering cup mounting means resiliently biasing said cup against lateral displacement from said axes, and means for rotating said centering pins to create lateral forces on the apple when said pins are misaligned with the stem and blossom indents.

* * * * *